United States Patent [19]

Grant et al.

[11] 4,422,713
[45] Dec. 27, 1983

[54] METHOD FOR MAKING HIGH EFFICIENCY HOLOGRAMS

[75] Inventors: Barbara D. Grant, San Jose; Magdalena M. Hilden, Felton; Carol R. Jones; Glenn T. Sincerbox, both of San Jose, all of Calif.

[73] Assignee: International Business Machines, Armonk, N.Y.

[21] Appl. No.: 369,284

[22] Filed: Apr. 16, 1982

[51] Int. Cl.³ .......................... G03H 1/18; G03C 5/22
[52] U.S. Cl. .......................................... 350/3.61; 430/1
[58] Field of Search ...................... 430/1, 2; 350/3.61, 350/320

[56] References Cited

PUBLICATIONS

Photographic Science and Engineering, vol. 24, No. 3, May/Jun. 1980, "The Mechanism of Volume Hologram Formation in Dichromated Gelatin," D. M. Samoilovich, A. Zeichner and A. A. Friesem, pp. 161-166.

*Primary Examiner*—Bruce Y. Arnold
*Attorney, Agent, or Firm*—Otto Schmid, Jr.

[57] ABSTRACT

A method for making high diffraction efficiency holograms from dichromated gelatin (DCG) including the steps of curing the DCG for a specified time under controlled temperature and humidity conditions, periodically removing the DCG material from the curing conditions, placing a dye spot on the cured DCG material, measuring the extent of diffusion of the dye spot after a predetermined time, replacing the DCG material into the curing conditions, repeating the method until dye spot diffusion of a predetermined size occurs, and using the DCG material at that cure state to make holograms.

11 Claims, 2 Drawing Figures

METHOD FOR MAKING HIGH EFFICIENCY HOLOGRAMS

DESCRIPTION

1. Field of the Invention

This invention relates to a method for making holograms and more particularly to a method for making high diffraction efficiency holograms from dichromated gelatin.

2. Description of the Prior Art

In recent years, the use of holographic optical elements has increased and numerous holographic recording materials have been proposed and developed. However, relatively few materials have been found capable of providing the high diffraction efficiencies required for the successful use of holographic optical elements as replacements for conventional refractive elements. One such material is dichromated gelatin (DCG), and holograms recorded in DCG contain phase structures that produce exceptionally high efficiencies. The mechanism by which the phase structure is created, however, is not well understood. As a result, the fabrication process has proven to be difficult to control with the major detrimental side effects being a decrease in diffraction efficiency and/or a high degree of scattered light due to a milky appearance. Much of the lack of reproducibility in the fabrication process appears to be related to the state of cure of the sensitized gelatin film prior to its exposure and processing. It has been proposed to measure the state of cure of the gelatin layers by means of melting point and swelling determinations. However, these techniques have not produced sufficient reproducibility to be useful in a manufacturing process.

SUMMARY OF THE INVENTION

According to the invention, a method is provided for making high diffraction efficiency holograms from dichromated gelatin (DCG) including the steps of curing the DCG to a specified time under specified temperature and humidity conditions; placing a dye spot on the cured DCG material; measuring the extent of diffusion of the dye spot after a predetermined time; repeating the method until the dye spot diffusion of a predetermined size occurs; and using the material at that cure state to make holograms.

DESCRIPTION OF THE PREFERRED EMBODIMENTS

Figure 1:
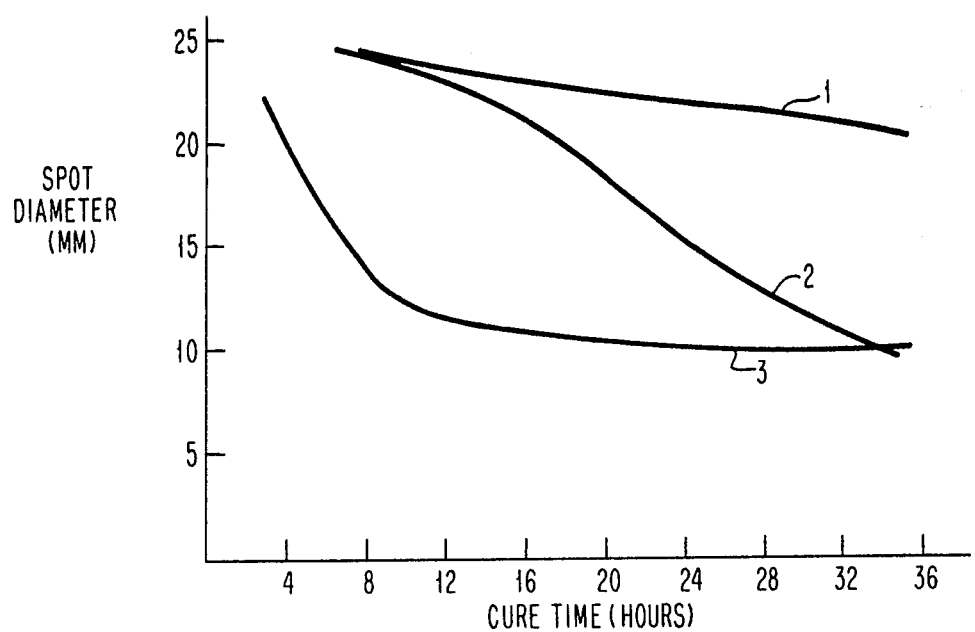
FIG. 1 is a plot of dye spot diffusion versus cure time.

The method of the invention utilizes dichromated gelatin (DCG) as a holographic recording material. DCG consists of a gelatin film sensitized with a water soluble dichromate salt, and various formulations are known in the art. The DCG must be at the proper cure state prior to the exposure and development of the sensitized gelatin film to form a hologram having high diffraction efficiency. The proper cure state, also referred to as "gelatin hardness", is believed to be related to the degree of cross linking of the gelatin matrix. Assuming that cross linking of gelatin molecules does occur, swelling determinations can be made to measure cross linking density. Differences in gelatin hardness manifest themselves as variations in swelling capacity during processing and in eventual diffraction performance of the hologram. According to the invention, we have developed a dye spot diffusion test method for determining and monitoring gelatin hardness which can be correlated with diffraction efficiency in the finished hologram to provide a test suitable for use in a hologram manufacturing process. The dye diffusion test comprises placing a measured drop of a suitable dye on the surface of a swollen film and measuring the degree of lateral dye diffusion in the water swollen gelatin layer. The measure of dye diffusion is correlated with the diffraction efficiency of a hologram formed with DCG of that cure state. By this technique, a preferred dye diffusion can be determined so that, in manufacture, it is necessary only to repeat the dye diffusion test periodically during cure until the predetermined dye diffusion is produced. This test indicates that the DCG is then at the proper cure state or gelatin hardness to proceed with exposure and development of the hologram.

The DCG is a formulation comprising photographic quality gelatin and a water soluble dichromate salt such as ammonium dichromate or potassium dichromate, for example. A suitable range of characteristics can be provided by a formulation comprising from about 0.1 to 1.1 gm of ammonium dichromate and 2.38 grams of photographic quality gelatin dissolved in 25 ml of deionized water. The formulation is filtered at about 70° F. and applied to a suitable precleaned substrate, glass, for example, by known coating techniques such as spin coating, dip coating, doctor blading or casting. The coating is then cured to the proper degree, followed by known techniques to produce a hologram.

One of the critical steps in the process is the cure step since the "cure" or "hardness" will greatly affect the quality and efficiency of the hologram after exposure and development. "Hardness" is presumably achieved by the reduction of CrVI to CrIII. This is the reaction which normally takes place during hologram exposure. CrIII is believed to interact with the gelatin to "cross-link" the film and thus impart properties to the film which will result in a large refractive index change upon development. Prior to exposure, this reaction must occur uniformly throughout the film. This prior reaction is generally referred to as "cure state" or "hardness." Failure to reach an appropriate hardness will result in a noisy hologram. Films which are too hard will not give adequate images or high efficiency holograms.

Hardness can be achieved prior to image wise exposure by photochemical, chemical, or thermal means. In general, thermal, dark curing is used. At an appropriate temperature, humidity, and time, the DCG will achieve the proper hardness. For example, the film is formed as described above with the selected amount of ammonium dichromate and cured at a humidity of 30–70% relative humidity (RH) at a temperature from about 100° to 140° F. in the dark. A typical time for curing of a film having 0.95 grams of ammonium dichromate in the formulation is 18 to 20 hours for a five micron thick film and curing conditions of 41% RH and 115° F.

The cure can also be produced by radiation exposure. A specific example of radiation curing utilizes a film formed from the appropriate formulation as described above, and cured at a relative humidity of 40–60% RH at room temperature under UV radiation of 0.71 milliwatts per cm² using a low pressure mercury flood exposure. A typical illumination time for a five micron film deposited from a formulation having 0.2 grams of ammonium dichromate is about six minutes.

To properly control a manufacturing process for holograms, the ability to measure the same degree of hardness regardless of variation in the progress of the cure is required. We have found that by taking DCG samples cured to specified times under specified temperature and humidity conditions, we can measure hardness by a dye-spot diffusion test. The dye spot diffusion test is carried out by spotting the sample with a drop of a suitable dye and measuring the size of the diffused dye spot. By measuring the dye diffusion over a range of different cure times, the diffusion can be plotted as a function of time. A typical example of such a plot is shown in FIG. 1 for three different curing conditions. Note that after the initial phase of the curing, the dye spot diameter ranges from about 25 mm to about 10 mm. The plot shows that spot size is related to cure time, and the amount of diffusion is less as the film becomes increasingly cross linked by the production of CrIII. Curve 1 represents curing at 117° F. and 26% RH, curve 2 represents curing at 115° F. and 41% RH, and curve 3 represents curing at 115° F. and 47% RH. As is evident from these curves, the measured dye spot diameter is very sensitive to changes in RH and varies significantly with cure time, especially for curing conditions at higher RH. The preferred curing conditions are along curve 2 where it can be seen that variations in cure time cause a smooth variation in spot diameter. This is in contrast to curve 3 where there is an initial rapid decrease in spot diameter, followed by a period of relatively minor changes in spot diameter. These results exhibit a sensitivity of the curing process to small fluctuations in RH and, hence, the need for this test. In this way, a state of readiness of the DCG material for holographic exposure can be determined independent of elapsed cure time and possible curing fluctuations.

Figure 2:
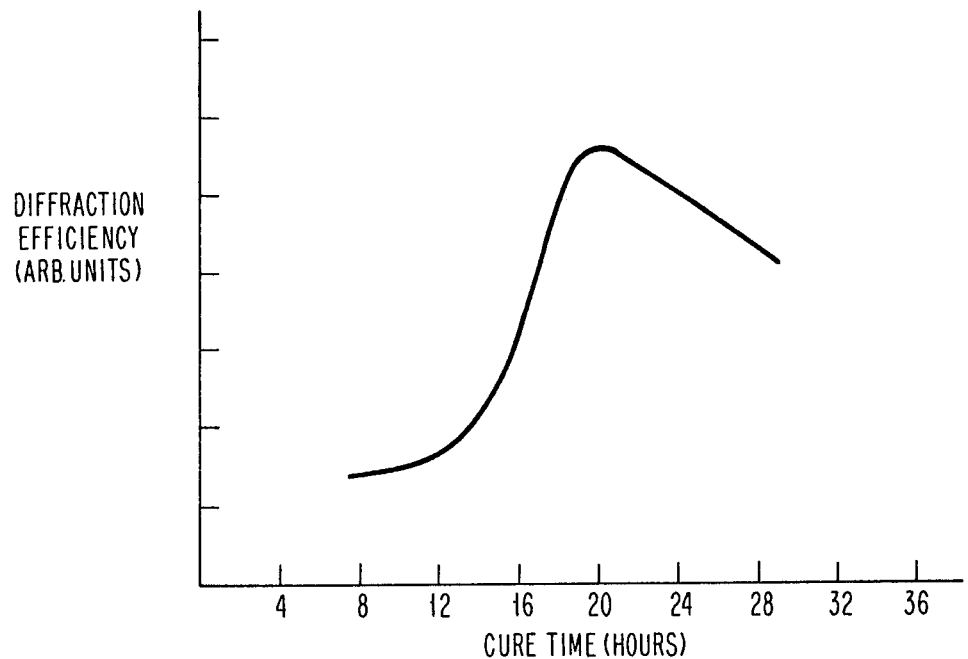
FIG. 2 is a plot of diffraction efficiency versus cure time.

To practice the method, it is necessary to run dye diffusion tests with the formulation of DCG selected for the application over a range of times at the temperature and humidity conditions selected to be used. Samples of the DCG at each of the times is used to make a hologram so that the diffraction efficiency can be measured for that hologram. A plot of cure time versus diffraction efficiency can then be made. FIG. 2 is a typical example of such a plot for curing conditions similar to those of curve 2 of FIG. 1. The diffraction efficiency starts low and increases to a peak, followed by a decrease in efficiency. The peak efficiency is usually reached between about 10 and 20 hours, depending on specific curing conditions. As is evident from the figure, there is indeed an optimum cure time required for maximum diffraction efficiency. The curve is sufficiently narrow as to permit only slight variations in the cure time. Under proper cure, exposure and processing conditions, efficiencies in excess of 70% can be routinely achieved, and under certain conditions, efficiencies in excess of 90% can be achieved.

A specific example of the dye spot diffusion test utilizes a suitable dye such as bromophenol blue dye. Other suitable dyes include water soluble dyes having sufficient contrast with the DCG material such as methylene blue and crystal violet. The chosen dye is prepared in an aqueous solution of a suitable concentration for use in the test. The dye spot diffusion test is carried out by removing a sample of the DCG, cooling the sample, soaking the sample in deionized water for a specified time, such as three minutes, air drying the sample for a specified time, such as seven minutes and spotting the sample with a fixed volume drop of a solution of the chosen dye. In a specific test, drops of a 1 mg/ml bromophenol blue dye solution were applied to the gelatin surface using a 50 $\mu$l pipet. After allowing 15 minutes for diffusion, average diameters of the diffuse dye spots were measured. The diameter of the dye spots was measured by overlaying the spots with a calibrated grid. The measurement may also be made by matching the spots against an aperture card or by calibrations superimposed in a low power microscope. The DCG material is removed from the curing environment while the dye spot diffusion test is being conducted. In the event that the measured diffusion spot size has not reached the predetermined size, the DCG is replaced into the curing environment for another increment of curing time. The DCG material is again removed and the dye spot diffusion test performed. These steps are repeated until the measured diffusion spot size reaches the predetermined size. The DCG material is then used at that cure state to make holograms.

While the invention has been particularly shown and described with reference to a preferred embodiment thereof, it will be understood by those skilled in the art that various other changes in the form and details may be made therein without departing from the spirit and scope of the invention.

Having thus described our invention, what we claim as new and desire to secure by Letters Patent is:

1. In a process for making high efficiency holograms from dichromated gelatin (DCG), the improved method comprising the steps of:
    curing the DCG for a specified time under specified temperature and humidity conditions;
    placing a dye spot on the cured DCG material;
    measuring the extent of diffusion of the dye spot after a predetermined time;
    repeating the method until dye spot diffusion of a predetermined size occurs; and
    using the material at that cure state to make holograms.

2. The method of claim 1 wherein said curing step is carried out in the dark at a temperature within the range of 100°–140° F. and at a relative humidity within the range of 30–70%.

3. The method of claim 1 wherein said curing step is carried out with radiation exposure at room temperature at a relative humidity within the range of 40–60%.

4. The method of claim 3 wherein said radiation exposure comprises exposure to ultraviolet radiation.

5. The method of claim 4 wherein said ultraviolet radiation is at a level of about 0.71 milliwatts per $cm^2$.

6. As an article of manufacture, a hologram prepared in accordance with the method of claim 1.

7. In a process for making high efficiency holograms from dichromated gelatin (DCG), the improved method comprising the steps of:
    curing the DCG for a specified time under specified temperature and humidity conditions;
    periodically removing the DCG material from the curing conditions;
    placing a dye spot on the cured DCG material;
    measuring the extent of diffusion of the dye spot after a predetermined time;
    replacing the DCG material into the curing environment;

repeating the method until dye spot diffusion of a predetermined size occurs; and using the material at that cure state to make holograms.

8. The method of claim 7 wherein said curing step is carried out in the dark at a temperature within the range of 100°–140° F. and at a relative humidity within the range of 30–70%.

9. The method of claim 7 wherein said curing step is carried out with radiation exposure at room temperature at a relative humidity within the range of 40–60%.

10. The method of claim 9 wherein said radiation exposure comprises exposure to ultraviolet radiation.

11. The method of claim 10 wherein said ultraviolet radiation is at a level of about 0.71 milliwatts per $cm^2$.

* * * * *